United States Patent
Zhu et al.

(10) Patent No.: US 9,239,413 B2
(45) Date of Patent: Jan. 19, 2016

(54) METHOD OF MANUFACTURING METAL GRATING

(71) Applicants: Tsinghua University, Beijing (CN); HON HAI PRECISION INDUSTRY CO., LTD., New Taipei (TW)

(72) Inventors: Zhen-Dong Zhu, Beijing (CN); Qun-Qing Li, Beijing (CN); Li-Hui Zhang, Beijing (CN); Mo Chen, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/262,812

(22) Filed: Apr. 28, 2014

(65) Prior Publication Data

US 2015/0087141 A1 Mar. 26, 2015

(30) Foreign Application Priority Data

Sep. 22, 2013 (CN) .......................... 2013 1 0429908

(51) Int. Cl.
*H01L 21/311* (2006.01)
*G02B 5/18* (2006.01)

(52) U.S. Cl.
CPC ............ *G02B 5/1809* (2013.01); *G02B 5/1857* (2013.01)

(58) Field of Classification Search
CPC .................. H01L 21/31116; H01L 21/31138; H01L 21/31144; H01L 21/3121; H01L 21/3124; H01L 21/67178; H01L 21/76802; H01L 21/76808; H01L 21/76826
USPC ......... 438/606, 619, 637, 656, 685–688, 694, 438/700, 702, 703, 706, 707, 710, 712, 725, 438/761, 778, 780, 785, 787, 942, 956, 438/FOR. 120, FOR. 132, FOR. 133
See application file for complete search history.

(56) References Cited

U.S. PATENT DOCUMENTS

| | | | |
|---|---|---|---|
| 2003/0153178 A1* | 8/2003 | Maile | 438/670 |
| 2004/0263290 A1 | 12/2004 | Sherrer et al. | |
| 2008/0246562 A1* | 10/2008 | Sherrer | H01P 3/06 333/260 |
| 2013/0015482 A1 | 1/2013 | Su | |
| 2013/0099281 A1* | 4/2013 | Yu et al. | 257/190 |
| 2015/0048380 A1* | 2/2015 | Koike et al. | 257/76 |

FOREIGN PATENT DOCUMENTS

| | | |
|---|---|---|
| TW | 200941746 | 10/2009 |
| TW | 201304208 | 1/2013 |

OTHER PUBLICATIONS

Che-Wei Hsu, Polarized White Light Emitting Diodes, National Taiwan University of science and technology, Dec. 31, 2012.

* cited by examiner

*Primary Examiner* — Kyoung Lee
*Assistant Examiner* — Joannie A Garcia
(74) *Attorney, Agent, or Firm* — Novak Druce Connolly Bove + Quigg LLP

(57) ABSTRACT

A method for making a metal grating is provided. The method includes providing a substrate, applying a metal layer on a surface of the substrate, forming a number of protrusions spaced from each other on a surface of the metal layer, wherein each of the number of protrusions is made of two resist layer, one of the two resist layers being made of silicone oligomer, etching the surface of the metal layer exposed out of the number of protrusions using a physical etching gas and a reactive etching gas, and dissolving the number of protrusions on the surface of the metal layer.

14 Claims, 5 Drawing Sheets

METHOD OF MANUFACTURING METAL GRATING

RELATED APPLICATIONS

This application claims all benefits accruing under 35 U.S.C. §119 from China Patent Application No. 201310429908.X filed on Sep. 22, 2013 in the China Intellectual Property Office, the disclosure of which is incorporated herein by reference.

BACKGROUND

1. Technical Field

The disclosure relates to a method of manufacturing metal grating.

2. Description of Related Art

A sub-wavelength grating is a common optical component in the semiconductor industry. The size of the sub-wavelength grating is similar to or less than the active wavelength of the sub-wavelength grating. It is difficult to make a quartz grating with high density, sub-wavelength, and mark-space ratio. The sub-wavelength grating can be made by electron beam lithography, focused ion beam lithography, deep-ultraviolet lithography, holographic lithography, and nano-imprint lithography.

Currently there is no method for making the sub-wavelength grating made of metal.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
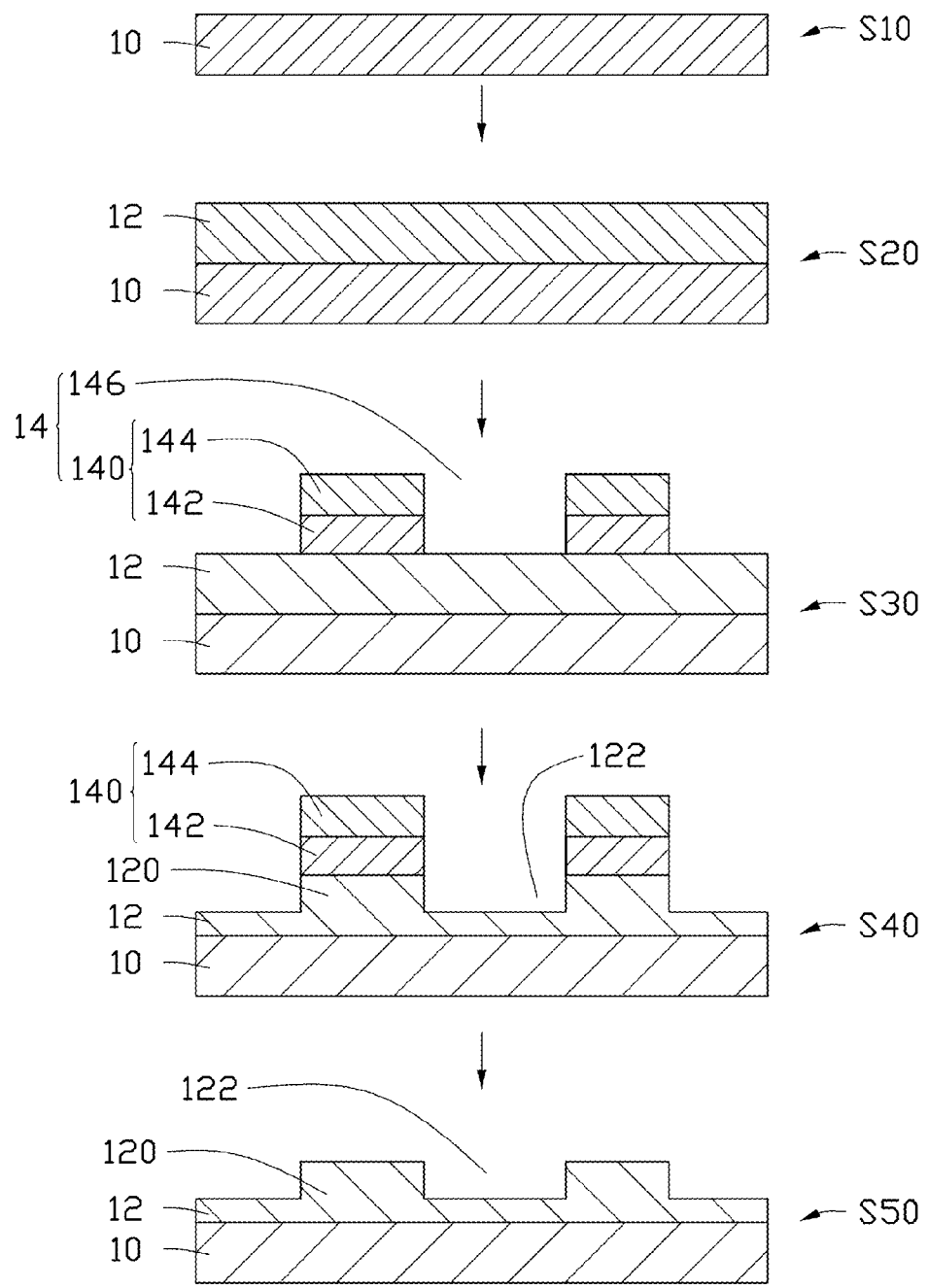
FIG. 1 is a schematic diagram showing one embodiment of a method of manufacturing a metal grating.

Referring to FIG. 1, one embodiment of a method of manufacturing a metal grating 30 comprises the following steps:

S10, providing a substrate 10;

S20, applying a metal layer 12 on a surface of the substrate 10;

S30, forming a patterned mask layer 14 on a surface of the metal layer 12, wherein the patterned mask layer 14 comprises a plurality of protrusions 140 spaced from each other and located on the surface of the metal layer 12, each of the plurality protrusions 140 comprises a first protrusion 142 and a second protrusion 144 stacked with each other, and the second protrusion 144 is made of silicone oligomer;

S40, etching part of the surface of the metal layer 12 exposed out of the patterned mask layer 140 using a physical etching gas and a reactive etching gas; and S50, dissolving the patterned mask layer 14 on the surface of the metal layer 12.

In step S10, the substrate 10 can be any shape such as a circular plate and a square plate. The substrate 10 can be a semiconductor substrate or a silicon substrate. The material of the substrate 10 can be gallium nitride (GaN), gallium arsenide (GaAs), sapphire, aluminum oxide, magnesium oxide, silicon, silica, silicon nitride, or silicon carbide. The silica can form a quartz substrate or a glass substrate. In one embodiment, the substrate 10 is a quartz substrate. The material of the substrate 10 can also be a P-type semiconductor or an N-type semiconductor, e.g. a P-type GaN or N-type GaN. Furthermore, the size, the thickness, and the shape of the substrate can be set as desired. The substrate 10 can be cleaned in a clean room.

In step S20, the metal layer 12 can be formed on the surface of the substrate 10 via electron beam evaporation or ion beam sputtering. The metal layer 12 can be made of gold, silver, copper, or aluminum. The thickness of the metal layer 12 should be greater than 10 nanometers to form a very sturdy self-supporting metal layer 12. The thickness of the metal layer 12 can be in a range from about 50 nanometers to about 250 nanometers. In one embodiment, the metal layer 12 is made of gold, and the thickness of the metal layer 12 is about 220 nanometers.

In step S30, the patterned mask layer 140 comprises a plurality of protruding structures 140 and a plurality of cavities 146 arranged in intervals. A part of the surface of the metal layer 12 can be exposed out of the patterned mask layer 14 through the cavities 146. The patterned mask layer 14 can be a continuous pattern or a discontinuous pattern. In one embodiment, the plurality of protruding structures 140 are strip structures oriented along a same direction, the first cavities 146 are defined between adjacent protruding structures 140. In one embodiment, the plurality of first protrusions 140 are square-shaped bars spaced with each other. A thickness of the plurality of protruding structures 140 can be in a range from about 150 nanometers to about 420 nanometers. A width of the plurality of protruding structures 140 can be in a range from about 20 nanometers to about 500 nanometers. A width of the cavities 146 can be in a range from about 80 nanometers to about 500 nanometers.

Each of the plurality protrusions 140 comprises a first protrusion 142 and a second protrusion 144 stacked with each other, and the second protrusion 144 is made of silicone oligomer. The first protrusion 142 and the second protrusion 144 have a similar shape. The first protrusion 142 is located on the surface of the metal layer 12. The second protrusion 144 is located on the first protrusion 142. The first protrusion 142 can be made of ZEP520, PMMA (Polymethylmethacrylate), PS (Polystyrene), SAL601, or ARZ72. The second protrusion 144 is made of silicone oligomer such as silsesquioxane (HSQ) or silicon on glass (SOG).

In one embodiment, the second protrusion 144 of the patterned mask layer 14 is made of HSQ, the protruding structures 140 are strip structures, the protruding structures 140 and the cavities 146 are arranged at regular intervals, the width of each protruding structure 140 is about 100 nm, and the depth of each cavity 146 is about 40 nm.

Figure 2:
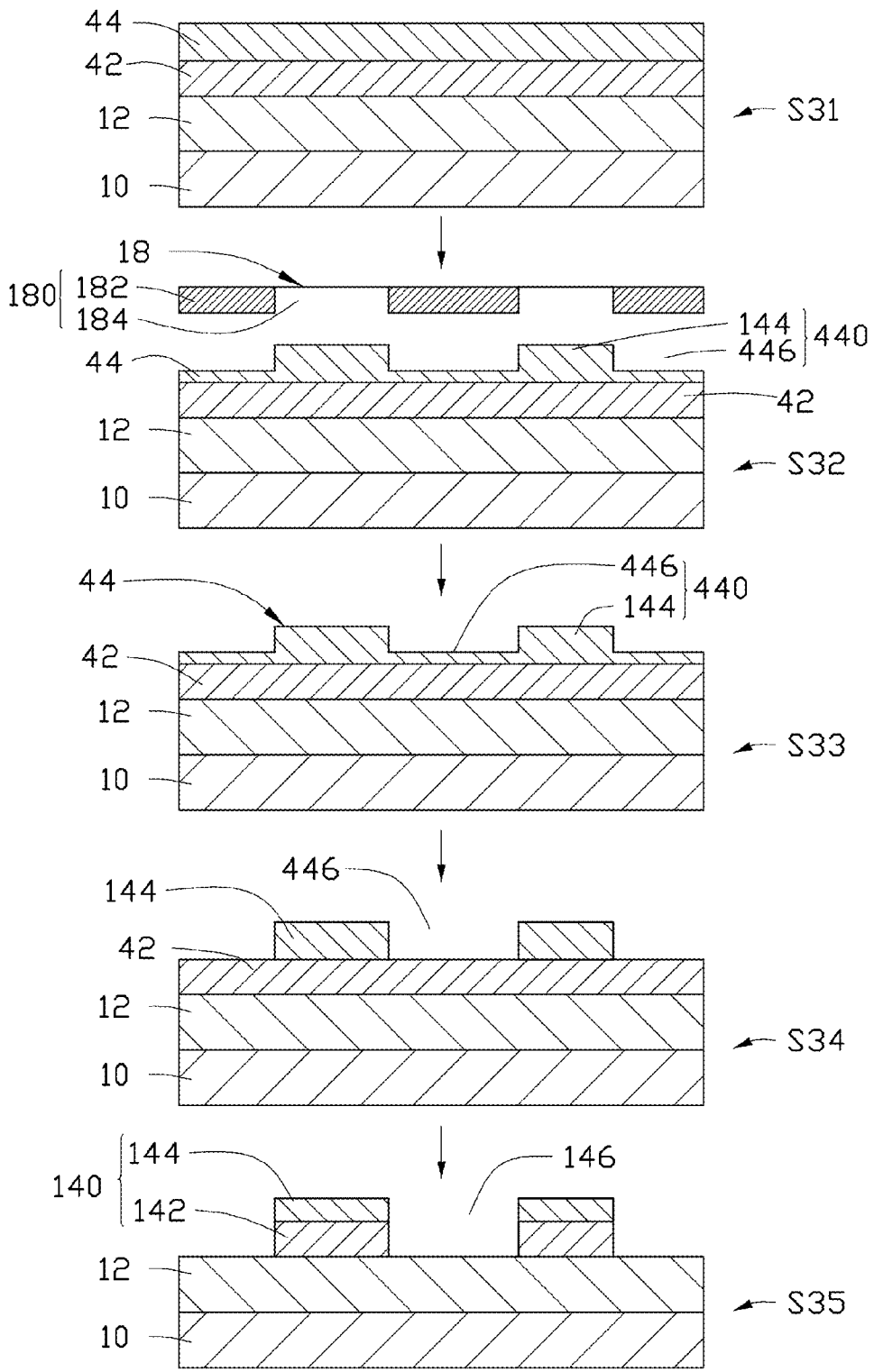
FIG. 2 is a schematic diagram showing the method for making a patterned mask layer used in the method of FIG. 1.

Referring to FIG. 2, the step S30 comprises the sub-steps of:

S31, forming a first resist layer 42 and then a second resist layer 44 on the surface of the metal layer 12;

S32, providing a master stamp 18 with a first nanopattern 180 defined therein;

S33, pressing the first nanopattern 180 of the master stamp 18 into the second resist layer 44 to form a second nanopattern 440;

S34, etching the second resist layer 44 to expose part of the first resist layer 42 out of the second nanopattern 440; and S35, etching the part of the first resist layer 42 exposed out of the second nanopattern 440 to expose part of the metal layer 12.

In step S31, the first resist layer 42 is firstly formed on the surface of the metal layer 12, and the second resist layer 44 is formed on a surface of the first resist layer 42. The first resist layer 42 is sandwiched between the second resist layer 44 and the metal layer 12. The first resist layer 42 can be made of the same material as the first protrusions 142. In one embodiment, the first resist layer 42 is made of ZEP520. The ZEP520 resist can be spin-coated on the surface of the metal layer 12 at a speed of about 500 rounds per minute to about 6000 rounds per minute, for about 0.5 minutes to about 1.5 minutes. Further, the ZEP520 resist coated on the surface of the metal layer 12 can be dried at a temperature of about 140 degrees centigrade to 180 degrees centigrade, for about 3 minutes to about 5 minutes. Thus, the first resist layer 42 is formed on the surface of the metal layer 12 located on the substrate 10. The thickness of the first resist layer 42 can be in a range of about 50 nanometers to about 200 nanometers.

In step S31, the second resist layer 44 can be a silicone oligomer layer of hydrogen silsesquioxane (HSQ) or silicon on glass (SOG), which can be deposited on the first resist layer 42 through a bead coating method or a spin-coating method. In one embodiment, the second resist layer 44 is made of HSQ, and the HSQ can be spin-coated on the first resist layer 42 under high pressure at a speed of about 2500 rounds per minute to about 7000 rounds per minute, for about 0.5 minutes to about 2 minutes. The thickness of the second resist layer 44 can be in a range of about 100 nanometers to about 220 nanometers.

In step S32, the master stamp 18 can be made of a rigid material, such as nickel, silica, silicon, and carbon dioxide. The master stamp 18 can also be made of a flexible material, such as PET, PMMA, polystyrene (PS), and polydimethylsiloxane (PDMS). The master stamp 18 can be fabricated through an electron beam lithography method with the first nanopattern 180 formed therein. The first nanopattern 180 can be designed according to the actual application. In one embodiment shown in FIG. 2, the master stamp 18 is made of silica, and the first nanopattern 180 comprises a plurality of first ribs 182 and a plurality of first grooves 184.

In step S33, the master stamp 18 is first placed on the second resist layer 44 with the first nanopattern 180 contacting the second resist layer 44. The master stamp 18 is then pressed towards the second resist layer 44 at room temperature. During this process, the first ribs 182 are pressed into the second resist layer 44, and some material of the second resist layer 44 are pressed into the first grooves 184. Finally, the master stamp 18 is removed from the second resist layer 44 with the first nanopattern 180 to form a second nanopattern 440 in the second resist layer 44. The second nanopattern 440 of the second resist layer 44 comprises a plurality of second protrusions 144 and a plurality of second grooves 446. The second protrusions 144 correspond to the first grooves 184. The second grooves 446 correspond to the first ribs 182.

In one embodiment, the master stamp 18 is pressed towards the second resist layer 44 at room temperature in a vacuum environment of about $1 \times 10^{-1}$ millibars to about $1 \times 10^{-5}$ millibars. The pressure applied on the master stamp 18 is about 2 pounds per square foot to about 100 pounds per square foot. The pressure is applied on the master stamp 18 for about 2 minutes to about 30 minutes. After step S33, there may be material of the second resist layer 44 remaining at the bottom of the second grooves 446.

In step S34, the material of the second resist layer 44 remaining at the bottom of the second grooves 446 is removed by a plasma etching method, and part of the first resist layer 42 is exposed out of the second nanopattern 440 via the second grooves 446.

In one embodiment, a $CF_4$ reactive plasma etching method can be used to remove the material of the second resist layer 44 remaining at the bottom of the second grooves 446. For example, the second resist layer 44 with the second protrusions 144 and the second grooves 446 formed therein can be placed in a $CF_4$ reactive plasma etching system. The $CF_4$ reactive plasma etching system generates $CF_4$ plasma, and the $CF_4$ plasma moves towards the second resist layer 44 to etch away the material of the second resist layer 44 remaining at the bottom of the second grooves 446, to expose part of the first resist layer 42 out of the second grooves 446.

The power of the $CF_4$ reactive plasma etching system can be in a range of about 10 watts to about 150 watts. The speed of the $CF_4$ plasma can be about 2 standard cubic centimeters per minute (sccm) to about 100 sccm. The partial pressure of the $CF_4$ plasma can be about 1 pascal (Pa) to about 15 Pa. The etching time can be about 2 seconds to about 4 minutes.

In step S35, part of the first resist layer 42 exposed by the second grooves 446 can be removed by oxygen plasma etching, and part of the first resist layer 42 covered by the second protrusions 144 is protected by the second protrusions 144 during the etching process. For example, the first resist layer 42 can be placed in an oxygen plasma etching system. The power of the oxygen plasma etching system can be in a range of about 10 watts to about 150 watts. The speed of the oxygen plasma can be about 2 sccm to about 100 sccm. The partial pressure of the oxygen plasma can be about 0.5 Pa to about 15 Pa. The etching time can be about 5 seconds to about 1 minute. During the process of etching the part of the first resist layer 42 exposed out of the second nanopattern 440, the part of the first resist layer 42 exposed out of the second grooves 446 is removed, and the plurality of first cavities 146 is obtained. The part of the first resist layer 42 covered by the second protrusions 144 remains, and the plurality of first protrusions 142 is obtained under the second protrusions 144. Each of the plurality of first protrusions 142 corresponds to one of the second protrusions 144, to form the plurality of protrusions 140. The plurality of cavities 146 and the plurality of protrusions 140 form the patterned mask layer 14.

In the step (S40), the metal layer 12 covered with the patterned mask layer 14 can be set in an etching system filled with the physical etching gas and reactive etching gas. The physical etching gas and reactive etching gas can be selected according to the material of the metal layer 12 and the pattern mask layer 14. The physical etching gas can be argon (Ar) or helium (He). The reactive etching gas can be chlorine ($Cl_2$), boron trichloride ($BCl_3$), oxygen ($O_2$) and carbon tetrafluoride ($CF_4$). In one embodiment, the physical etching gas is Ar, the reactive etching gas is O2.

In step S40, the part of the metal layer 12 exposed out of the patterned mask layer 14 can be totally or partly removed, thereby obtaining a plurality of metal protrusions 120 and a plurality of metal grooves 122. If the part of the metal layer 12 at the bottom of the plurality of cavities 146 are totally removed, the plurality of grooves 122 is through grooves. If the part of the metal layer 12 at the bottom of the plurality of cavities 146 are partly removed, the plurality of grooves 122 is blind grooves.

Each protrusion 140 protrudes out of the surface of the metal layer 12, and is substantially perpendicular to the surface of the metal layer 12. During the etching process, metal particles or metal powders are produced from the part of the metal layer 12 exposed out of the cavities 146. If there is no reactive etching gas in the etching process, some of the metal particles or the metal powders would deposit on a side of each protrusion 140, thereby forming a sub-metal layer on the side of each protrusion 140. Therefore, the pattern of the metal grating 100 obtained would have more defects, and would not be smooth. The reactive etching gas in the etching process of step S40 can solidify and shrink the second protrusions 144. Thus the metal particles or the metal powders would not deposit on a side of each second protrusion 144. Further, the reactive etching gas in the etching process of step S40 can react with the material of the first protrusions 142 and the material of the second protrusions 144, which prevents the metal particles or the metal powders from depositing on sides of each first protrusions 142. Thus, the grooves of the metal grating 100 obtained by the method provided in this disclosure would be smooth and regular.

A flow speed of the physical etching gas can range from about 25 sccm to about 150 sccm, and a flow speed of the reactive etching gas can range from about 5 sccm to about 15 sccm. A power of the etching system can be in a range form about 50 watts to about 150 watts. A pressure of the etching system can be in a range from about 10 Pa to about 30 Pa. An etching time can be in a range from about 5 sec to about 5 min. In one embodiment, the metal layer 12 is made of gold, and the etching gas is mixture of Ar and $O_2$, wherein the flow speed of the Ar is about 48 sccm, the flow speed of $O_2$ is about 10 sccm, the pressure of the etching system is about 26 Pa, the power of the etching system is about 70 watts, and the etching time is about 50 sec.

In step S50, the patterned mask layer 140 is removed by dissolving it in an organic solvent. The organic solvent can be tetrahydrofuran (THF), acetone, butanone, cyclohexane, n-hexane, methyl alcohol, or absolute ethyl alcohol. In one embodiment, the organic solvent is butanone, and the patterned mask layer 140 is dissolved in the butanone to obtain the metal grating 100.

Figure 3:
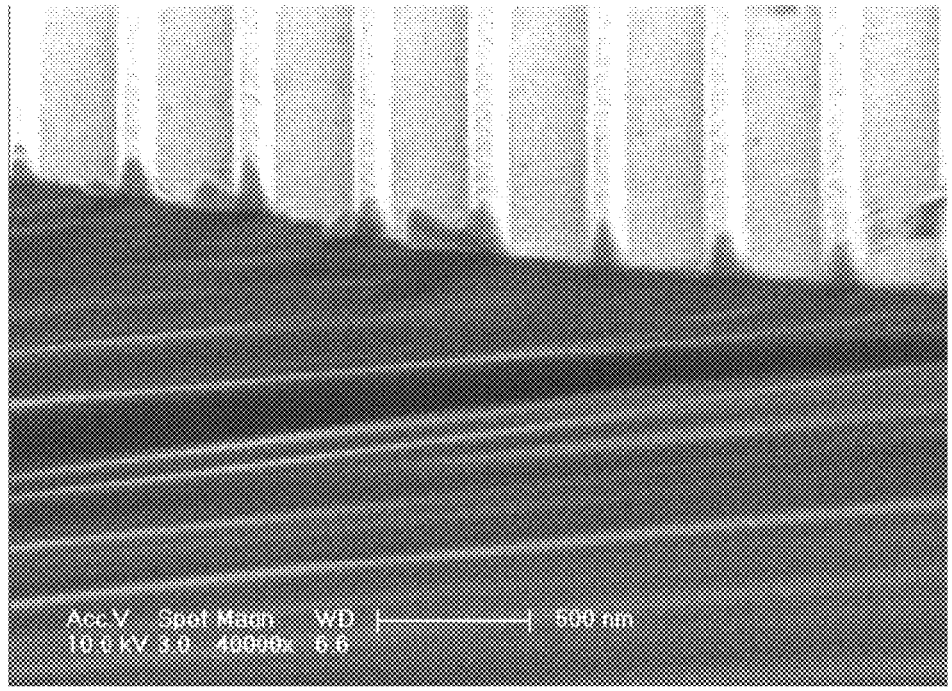
FIG. 3 is an image taken by a scanning electron microscope, of the metal grating by the method in FIG. 1.
Figure 4:
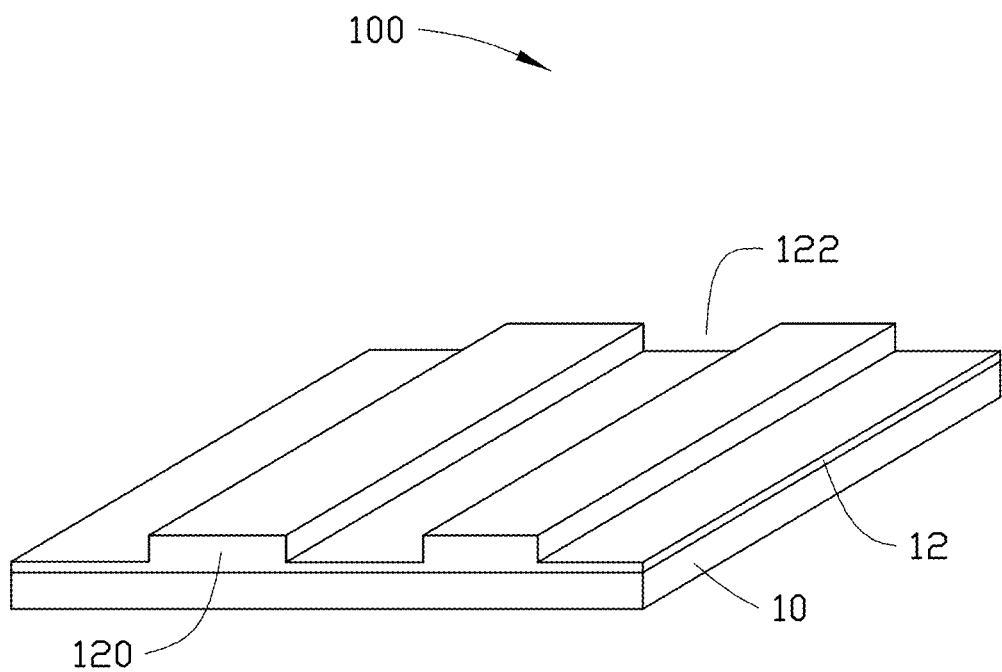
FIG. 4 is a schematic diagram showing the metal grating obtained by the method in FIG. 1.

Referring to FIG. 3 and FIG. 4, the metal grating 100 comprises a substrate 10 and a plurality of metal protrusions 120 spaced from each other and located on the substrate 10. A metal groove 120 is defined between every two adjacent metal protrusions 120. A depth of the metal groove 120 can be in a range from about 150 nanometers to about 220 nanometers. A width of the metal protrusions 122 can be in a range from about 50 nanometers to about 200 nanometers. A width of metal groove 120 can be in a range from about 50 nanometers to about 200 nanometers.

The metal protrusions 120 can be equally spaced, and the metal grooves 122 can be equally spaced. Each of the metal protrusions 120 can have the same size and shape. In addition, the metal protrusions 120 and the connecting metal layers 36 have the same extension direction. Each of the metal protrusions 120 has opposing sidewalls, which are substantially perpendicular to the surface of the substrate 110. In addition, the metal protrusions 120 and the metal grooves 122 are integrated to form a single solid structure.

In one embodiment, the plurality of metal protrusions 120 are strip shaped structures, and are arranged at regular intervals, the width of metal protrusion 120 is about 100 nm, and the height of the metal protrusions 120 is about 220 nm.

Figure 5:
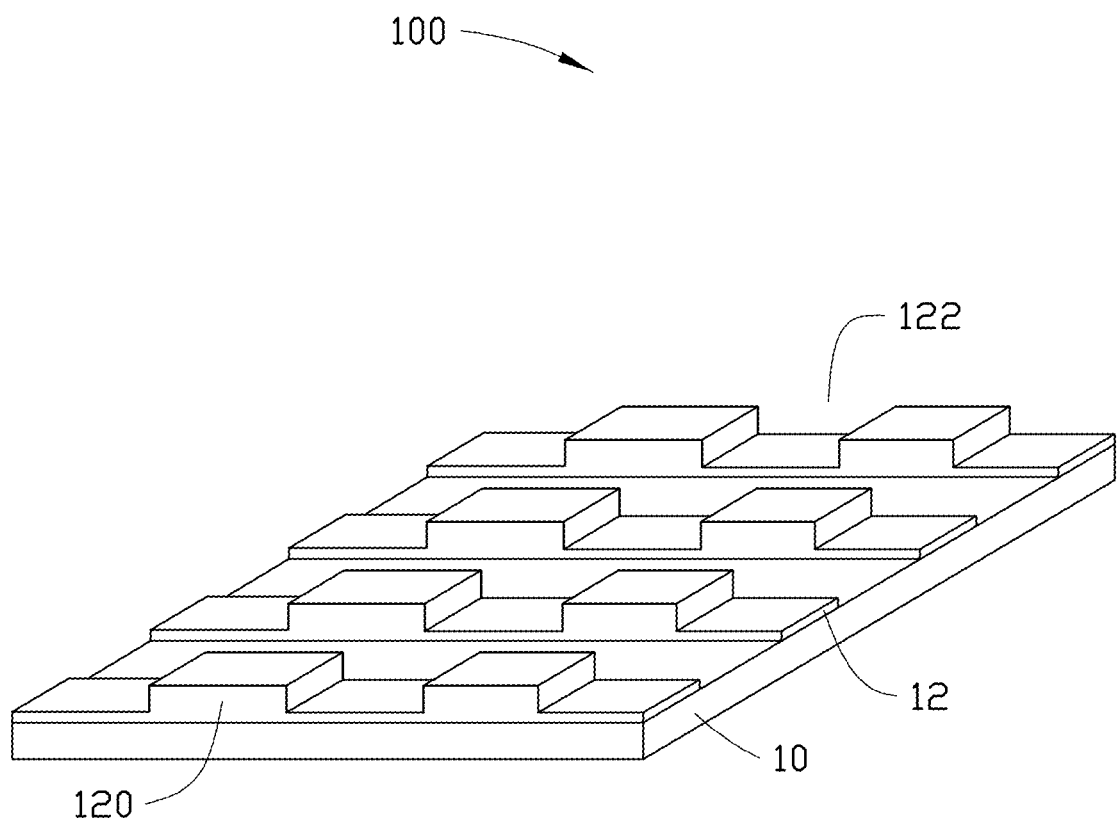
FIG. 5 is a schematic diagram showing a metal grating obtained by the method in FIG. 1 in one embodiment.

Referring to FIG. 5, in one embodiment, the metal grating 100 comprises a plurality of metal layers 12 spaced and substantially parallel to each other. Each metal layer 12 comprises a plurality of metal protrusions 120 and a plurality of metal grooves 122. The bottom of the plurality of concave portions 122 and the metal protrusions 120 are attached to the substrate 10. The metal protrusions 120 are closed square shaped structures regularly arranged.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A method of manufacturing a metal grating, the method comprising:
    S10, providing a substrate;
    S20, applying a metal layer on a surface of the substrate;
    S30, forming a patterned mask layer on a surface of the metal layer, wherein the patterned mask layer comprises a plurality protrusions spaced from each other and located on the surface of the metal layer, each of the plurality protrusions comprises a first protrusion and a second protrusion stacked on top of the first protrusion, the first protrusion is made of ZEP520, EMMA, PS, SAL601, or ARZ72, and the second protrusion is made of a silicone oligomer;
    S40, etching part of the surface of the metal layer exposed out of the patterned mask layer using a physical etching gas and a reactive etching gas; and
    S50, dissolving the patterned mask layer on the surface of the metal layer.

2. The manufacturing method of claim 1, wherein in the step S10, the material of the substrate is gallium nitride, (GaN), gallium arsenide (GaAs), sapphire, aluminum oxide, magnesium oxide, silicon, silica, silicon nitride, or silicon carbide.

3. The manufacturing method of claim 1, wherein in the step S20, the metal layer is formed on the surface of the substrate via electron beam evaporation or ion beam sputtering.

4. The manufacturing method of claim 3, wherein the metal layer is made of gold, silver, platinum, palladium, copper, or aluminum.

5. The manufacturing method of claim 3, wherein a thickness of the metal layer is in a range from about 50 nanometers to about 250 nanometers.

6. The manufacturing method of claim 1, wherein in the step S30, parts of the metal layer is exposed out of the patterned mask layer.

7. The manufacturing method of claim 6, wherein the silicone oligomer is HSQ or SOG.

8. The manufacturing method of claim 1, wherein the step S30 comprises the following steps:
    S31, forming a first resist layer and then a second resist layer on the surface of the metal layer;
    S32, providing a master stamp with a first nanopattern defined therein, the first nanopattern comprises a plurality of first ribs and a plurality of first grooves;

S33, pressing the first nanopattern of the master stamp into the second resist layer to form a second nanopattern; and S34, etching the second resist layer to expose a part of the first resist layer out of the second nanopattern; and S35, etching the part of the first resist layer exposed out of the second nanopattern to expose a part of the metal layer.

9. The manufacturing method of claim 8, wherein in the step S31, wherein the first resist layer is made of ZEP520, PMMA, PS, SAL601, or ARZ72.

10. The manufacturing method of claim 9, wherein the second resist layer is made of HSQ or SOG.

11. The manufacturing method of claim 8, wherein the master stamp is made of silica, and the first nanopattern comprises a plurality of first ribs and a plurality of first grooves.

12. The manufacturing method of claim 8, wherein in the step S34, the second nanopattern of the second resist layer comprises the plurality of second protrusions and a plurality of second grooves, the plurality of first ribs correspond to the plurality of second grooves, and the plurality of first grooves correspond to the plurality of first protrusions.

13. The manufacturing method of claim 12, wherein in the step S35, the part of the first resist layer exposed by the second grooves is removed by oxygen plasma etching, and the part of the first resist layer covered by the second protrusions is protected by the second protrusions during the etching process to obtain the first protrusions.

14. The manufacturing method of claim 13, wherein the patterned mask layer comprises the plurality of first protrusions and a plurality of first cavities arranged in intervals.

* * * * *